United States Patent
Lewis et al.

(10) Patent No.: US 12,511,308 B2
(45) Date of Patent: Dec. 30, 2025

(54) EFFICIENT EVALUATION OF QUERIES ACROSS MULTIPLE COLUMNAR STORAGE TIERS

(71) Applicant: Oracle International Corporation, Redwood Shores, CA (US)

(72) Inventors: Sheldon Andre Kevin Lewis, San Mateo, CA (US); Teck Hua Lee, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 321 days.

(21) Appl. No.: 18/140,152

(22) Filed: Apr. 27, 2023

(65) Prior Publication Data
US 2024/0111743 A1    Apr. 4, 2024

Related U.S. Application Data

(60) Provisional application No. 63/411,795, filed on Sep. 30, 2022.

(51) Int. Cl.
| | |
|---|---|
| *G06F 16/27* | (2019.01) |
| *G06F 16/22* | (2019.01) |
| *G06F 16/23* | (2019.01) |
| *G06F 16/245* | (2019.01) |
| *G06F 16/2453* | (2019.01) |
| *G06F 16/2455* | (2019.01) |
| *G06F 16/25* | (2019.01) |
| *G06F 16/28* | (2019.01) |

(52) U.S. Cl.
CPC ............ *G06F 16/27* (2019.01); *G06F 16/221* (2019.01); *G06F 16/2365* (2019.01); *G06F 16/2379* (2019.01); *G06F 16/2453* (2019.01); *G06F 16/24552* (2019.01); *G06F 16/24561* (2019.01); *G06F 16/24569* (2019.01); *G06F 16/258* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 11,941,014 B1 * | 3/2024 | Das | G06F 16/219 |
| 12,169,487 B1 * | 12/2024 | Chaturvedi | G06F 16/221 |
| 2021/0200718 A1 * | 7/2021 | Zheng | G06F 16/90335 |

* cited by examiner

*Primary Examiner* — Neveen Abel Jalil
*Assistant Examiner* — John J Morris
(74) *Attorney, Agent, or Firm* — Hickman Becker Bingham Ledesma LLP; Stephen R. Tkacs

(57) ABSTRACT

A multiple-tier operation evaluates a query across storage tiers in columnar format. A database server receives from a client a query for reading values from a set of columns of a database table. The multiple-tier operation comprises accessing a first subset of rows for the set of columns in columnar format in a first tier to generate a first set of results and accessing a second subset of rows for the set of columns in columnar format in a second tier to generate a second subset of results. The multiple-tier operation further comprises aggregating the first set of results and the second set of results to form a query result set and returning the query result set to the client.

20 Claims, 7 Drawing Sheets

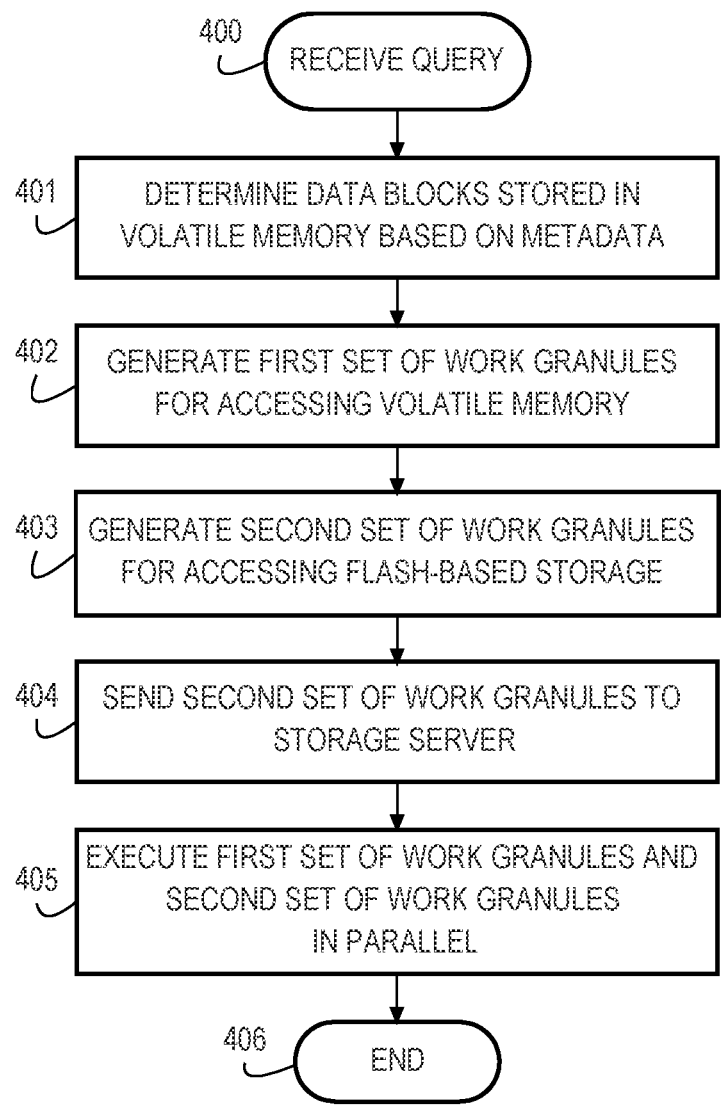

EFFICIENT EVALUATION OF QUERIES ACROSS MULTIPLE COLUMNAR STORAGE TIERS

BENEFIT CLAIM

This application claims the benefit under 35 U.S.C. § 119(e) of provisional application 63/411,795, filed Sep. 30, 2022, the entire contents of which is hereby incorporated by reference for all purposes as if fully set forth herein. The applicants hereby rescind any disclaimer of claim scope in the priority applications or the prosecution history thereof and advise the USPTO that the claims in this application may be broader than any claim in the priority applications.

FIELD OF THE INVENTION

The present invention relates to tiered storage in database systems and, more particularly, to evaluation of queries using columnar format data across multiple storage tiers.

BACKGROUND

Databases often store data in various storage tiers that utilize distinct storage technologies (e.g., dynamic random-access memory (DRAM), flash storage, disk). Storage class tiers address the need for both performant, frequently accessed "hot" storage, less frequently accessed "cool" storage, and rarely accessed "cold" storage. Storage tiers help maximize access performance where appropriate and minimize storage costs where possible.

Given that main memory is becoming cheaper and larger, new data formats are needed to speed query processing when data is stored in memory. Existing formats are designed for disk and, when stored in memory (e.g., in the buffer cache), the formats are not optimal for queries. For example, it is common for database systems to store data persistently in "disk blocks." Typically, within each disk block, data is arranged in row-major format. That is, the values of all columns of one row are followed by the values of all columns for the next row.

To speed up performance, some of the disk blocks may be cached in a "buffer cache" within volatile memory. Accessing the data from volatile memory is significantly faster than accessing the data from disk. However, even within the volatile memory, the data is still in the format of row-major disk blocks, which is not optimal for certain types of database operations.

In contrast to row-major disk blocks, columnar formats have many attractive advantages for query processing in memory, such as cache locality and compression. Consequently, some database servers now employ new table types for persistently storing data in column-major formats. In column-major format, the data may be read into volatile memory where it can be used to process certain queries more efficiently than would be possible if the data were stored in row-major disk blocks.

Use cases for columnar formats include table scans for queries that require reading an entire table and fast analytic queries. A table scan, also referred to as a sequential scan, is a scan made on a database where each row of a table is read and the columns encountered are checked for a condition. For example, a query that is not indexed results in a full table scan, where the database processes each record of the table to find all records meeting the given requirements. Even if the query selects only a few rows from the table, all rows in the entire table must be examined. Typically, analytic queries access a few columns from a table and examine all entries in those columns. Such queries involve scanning the entire table or segment, not just a small part of the table to answer the queries. However, in current tiered storage implementations utilizing columnar formats, there is a trade-off between storing all rows of a few columns of a table or small portions of many columns in columnar format in memory. Thus, a scan of a table may be 100 times faster using the in-memory column store, but if only 10% of the table is in the column store, then the benefit may be only a 1.1 times improvement rather than 100 times improvement. This is because 90% of the table must be read using the conventional row store in the storage server rather than the in-memory column store.

Previous solutions required a decision to be made between (a) retrieving the table's data entirely from the row-major format storage, or (b) retrieving as much data as possible from an in-memory column store, and the remainder of the data (if any) from the row-major format storage. Often, data was only retrieved from the in-memory column store for a table scan if a sufficient portion of the table was in memory (e.g., 80%). These solutions lead to in-memory columnar storage often being left unused for table scans and analytic queries, thus failing to benefit from the in-memory column store.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 4A is a flowchart illustrating operation of a database system accessing multiple-tier column storage in accordance with an illustrative embodiment.

DETAILED DESCRIPTION

Figure 1:
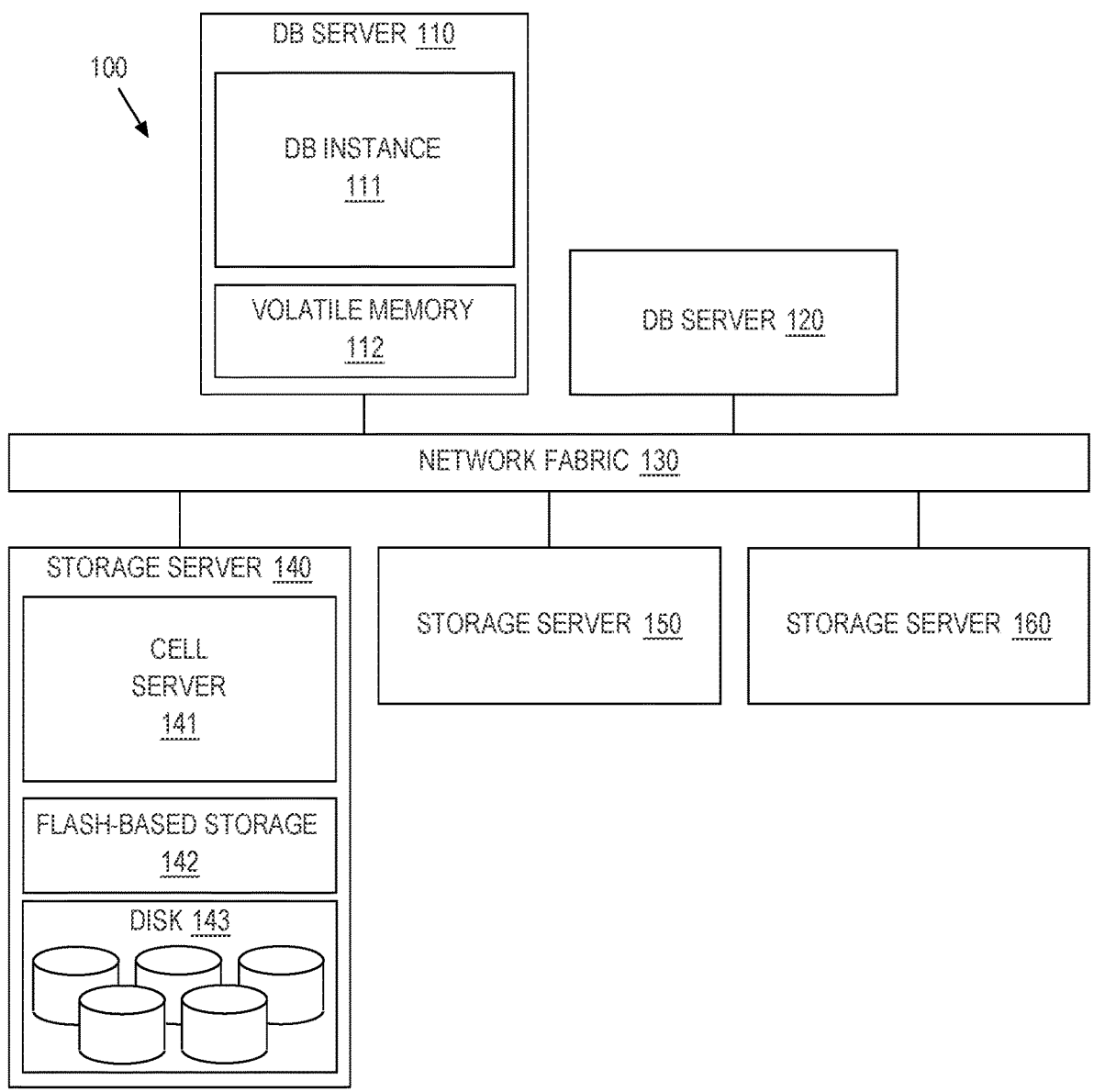
FIG. 1 is a block diagram of a database architecture in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments described hereinbelow allow a single query to leverage columnar scans across different storage tiers. The illustrative embodiments provide efficient evaluation of queries across multiple storage tiers, each of which has different rows of the same table in column-major format. The illustrative embodiments allow end-to-end columnar processing across different tiers when the dataset in question (e.g., all rows of a table) may not fit completely in volatile memory.

For example, in response to receiving a query for reading values from a set of columns of a database table, the database server may perform a multiple-tier operation that involves (a) accessing a first subset of rows for the set of columns in columnar format in a first tier to generate a first set of results, (b) accessing a second subset of rows for the set of columns in columnar format in a second tier to generate a second set of results, and (c) aggregating the first set of results and the second set of results to form a query result set.

In some embodiments, a database server scans in-memory columnar storage for some of the data required by a query, and completes the scan by offloading, to a storage server that has flash-based columnar storage, the task of obtaining data that are not present in memory at the database server. In addition, the storage server may leverage disk-based columnar formats for data that are not present in the flash-based columnar storage.

In accordance with some embodiments, multiple columnar storage engines are initialized across the tiers of the database system at scan time. A columnar storage engine is a software component that accesses data from underlying file systems in the physical format of blocks, extents, and segments and provides the data in the logical columnar format. The columnar storage engine in the database server returns query results for the first subset of rows from the in-memory columnar store, and the columnar storage engine in the storage server returns query results for the second subset of rows from the flash-based columnar store and/or from disk-based columnar storage. The query results from the different tiers are then combined to present the results of the query. The multiple columnar storage engines seamlessly drive a scan by combining results from multiple columnar stores across the tiers of the database system. As a result, a single scan can seamlessly stitch together columnar results from memory, flash-based storage, and disk.

The illustrative embodiments allow for usage of a reduced size volatile memory column store for "hot" data (i.e., rows and/or columns that are accessed more frequently) with minimized performance penalty for data not in the volatile column store, thus allowing in-memory column store usage in cloud environments. The subsets of columns stored in columnar format can be determined based on access frequency statistics such that the columns stored in the columnar format are columns that are accessed more frequently than columns not stored in columnar format. That is, the columns that are more likely to be accessed in a table scan or analytic query can be stored in columnar format for improved performance of table scans and analytic queries. In addition, a first subset of rows stored in the in-memory column storage and a second subset of rows stored in flash-based column storage can be determined based on access frequency statistics such that rows in the in-memory column storage are accessed more frequently than rows in the flash-based column storage.

In some embodiments, columnar format comprises a compressed read-only format. The aggregated result set can be returned to the client in this compressed read-only format. In an alternative embodiment, the result sets from each tier can be decompressed prior to returning the results to the client. In another embodiment, the result sets or the aggregated result set can be converted to row-major format prior to returning the results to the client. This allows results to be returned in a format that is usable by the requesting application and allows the tiers from which data are read and the formats in which the data are stored are transparent to the application.

In some embodiments, metadata stored in the database server are used to determine a first set of data blocks for the query that are stored in the first tier in the database server and a second set of data blocks that are stored in the storage tier (i.e., not stored in the first tier). The database server generates a first set of work granules for accessing the first set of data blocks in the database server and a second set of work granules for accessing the second set of data blocks in the storage server. The first set of work granules can be executed in the database server can be executed in parallel with the second set of work granules being executed in the storage server. In one embodiment, metadata in the storage server are used to determine a first subset of data blocks for the query that are stored in flash-based storage and a second subset of data blocks for the query that are stored in disk storage (i.e., not stored in flash-based storage). The storage server divides the second set of work granules into a first subset of work granules for accessing the flash-based storage and a second subset of work granules for accessing the disk storage. The first subset of work granules and the second subset of work granules can be executed in the storage server in parallel. In this manner, any performance penalty for offloading the scan to the storage server tier can be minimized by using parallel execution of work granules.

Database Architecture

FIG. 1 is a block diagram of a database architecture in which aspects of the illustrative embodiments may be implemented. The database architecture 100 comprises database servers 110, 120, a network fabric 130, and storage servers 140, 150, 160. The database architecture 100 employs a modern scale-out architecture encompassing database compute, storage, network, and software, enabling enterprises to add capacity and increase performance as workloads scale. In one embodiment, each database server 110, 120 is connected to every other database server or storage server 140, 150, 160 via network fabric 130 in a network topology that ensures a minimum number of hops between components. While the example depicted in FIG. 1 shows two database servers and three storage servers, any number of database servers and storage servers can be included depending on the implementation.

Database server 110, which is representative of other database servers in the database architecture 100, includes at least one database instance 111 executing on one or more processors (not shown) and volatile memory 112. The volatile memory 112 may be, for example, dynamic random-access memory (DRAM). Storage server 140, which is representative of other storage servers in the database architecture 100, includes at least one cell server instance 141 executing on one or more processors (not shown), flash-based storage 142, and disk storage 143. Flash-based storage, also referred to as flash memory, is an electronic non-volatile memory storage medium that can be electrically erased and reprogrammed. Flash-based storage has fast read access time, but not as fast as DRAM. Flash-based storage is persistent; data stored in flash-based storage is not lost in case of a power disruption or outage, unlike volatile memory. Database instance 111 executes database commands that are submitted to the database server 110 by one or more database applications or clients (not shown). These commands include queries to access data stored in disk storage 143, for example.

Typically, within each disk block, data are arranged in row-major format. That is, the values of all columns of one row are followed by the values of all columns of the next row. To improve performance of the database instances responding to these queries, data from disk storage 143 can be mirrored or cached into flash-based storage 142 at the storage server level and/or volatile memory 112 at the database server level. A buffer cache refers to copies of disk blocks in row-major format stored in volatile memory 112, for example. Accessing data from buffer cache is faster than accessing data from flash-based storage and accessing data from flash-based storage is faster than accessing data from disk. However, even within the volatile memory, data may still be in row-major format, which is not optimal for certain types of database operations such as table scans and analytic queries.

In some embodiments, volatile memory 112 can store an in-memory column store, which is a mirror or cache of data from disk storage 143. An in-memory column store maintains copies of tables, partitions, and individual columns in a compressed columnar format that is optimized for rapid scans. In many implementations, the in-memory column store does not replace row-based storage or the buffer cache in volatile memory; rather, the in-memory column store supplements row-based storage and buffer cache. In the in-memory column store, each column is a separate structure. The columns are stored contiguously, which optimizes them for analytic queries or table scans. The database buffer cache can store data in the traditional row-major format. In the database buffer cache, data blocks store the rows contiguously, optimizing them for transactions.

In a pure in-memory scan, all data is accessed from the in-memory column store. Scans of the in-memory column store are faster than scans of row-based data due to elimination of buffer cache overhead, data pruning to scan only the columns necessary for the query, compression that allows filters to be applied against the compressed format, and vector processing to use single instruction, multiple data (SIMD) vector instructions to read a set of values in a single instruction rather than reading the values one-by-one.

In an in-memory hybrid scan, rows are retrieved from both the in-memory column store and the row store. In such a hybrid scan, the row store is accessed from the storage server 140 when data is not in the in-memory column store in volatile memory 112. Thus, a scan of a table may be 100 times faster using the in-memory column store, but if only 10% of the table is in the column store, then the benefit may be only a 1.1 times improvement rather than 100 times improvement. This is because 90% of the table must be read using the conventional row store in the storage server 140 rather than the in-memory column store in the database server 110.

In another implementation, the storage server 140 may store a copy data from disk 143 into flash-based storage 142 in columnar format. The cell server instance 141 is a software component responsible for services provided by storage server 140, including query processing offload, input/output (IO) resource management, disk storage and flash-based storage tiering, storage index creation, and maintenance. In such an implementation, the database instance 111 determines whether the sufficient amount of the data required by a query is stored in in-memory column store in volatile memory 112. If so, the database instance 111 reads the in-memory column store in volatile memory 112 to satisfy the query; otherwise, the database instance 111 offloads query processing to cell server 141 in the storage server 140. By offloading query processing to the storage server 140, the scan may run faster by virtue of an increased number of processors available within the storage server 140, which results in greater parallelism. However, this is not always the case, and there may be many instances where offloading the entire scan to the storage server results in a performance penalty. Furthermore, in this implementation, the scan is performed either entirely at the database server or entirely at the storage server 140. Thus, there may be instances where an in-memory column store exists in volatile memory 112, including data that could be used in the scan but remains unused when the scan is offloaded to the storage server, which results in inefficient use of memory resources.

Evaluation of Queries Across Storage Tiers

Figure 2:
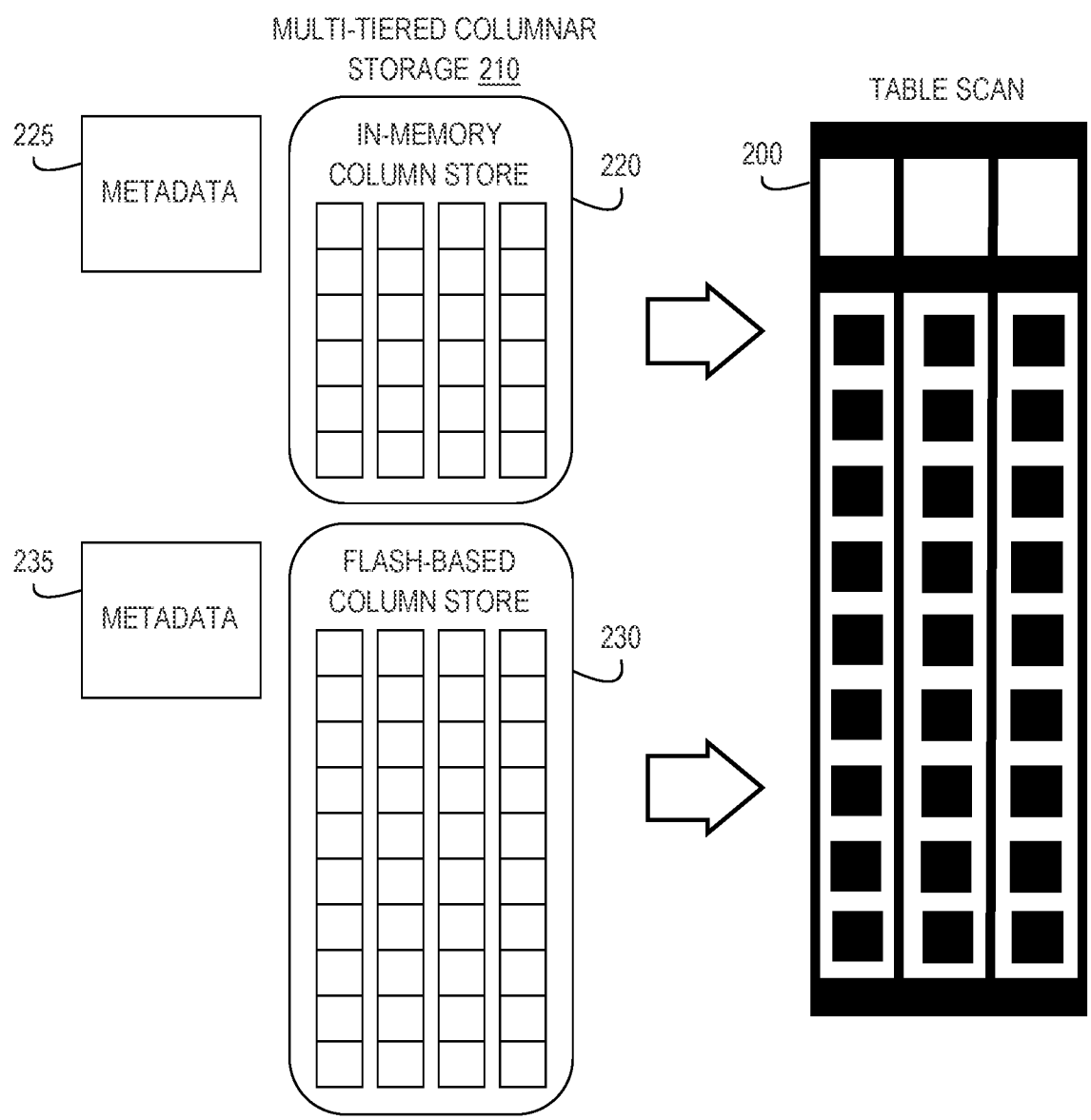
FIG. 2 illustrates evaluation of a query across multiple storage tiers in columnar format in accordance with an illustrative embodiment.

In accordance with an illustrative embodiment, a database query is evaluated across storage tiers such that data are read from multiple tiers in columnar format to satisfy the query. FIG. 2 illustrates evaluation of a query across multiple storage tiers in columnar format in accordance with an illustrative embodiment. In the depicted example, a query is received from a requesting application or client where the query involves a table scan to read all rows of a set of columns in a database table.

Multi-tiered columnar storage 210 includes in-memory column store 220 and flash-based column store 230. In one embodiment, the in-memory column store 220 is stored in volatile memory at the database server and flash-based column store 230 is stored in flash-based storage at the storage server. The example depicted in FIG. 2 shows two tiers for simplicity of illustration, including an in-memory tier (or database server tier) and a flash-based tier (or storage server tier). In other embodiments, the multi-tiered columnar storage 210 may include more tiers or sub-tiers. For example, the database server can include a flash-based column store such that the database server tier has two sub-tiers including an in-memory sub-tier and a flash-based sub-tier. As another example, the storage server can include a disk column store such that the storage server tier has two sub-tiers including a flash-based sub-tier and a disk sub-tier.

In accordance with an illustrative embodiment, the multi-tiered columnar storage 210 is partitioned horizontally rather than vertically. That is, rather than storing columnar format data structures that maintain entire columns of a database table in the in-memory column store 220, the multi-tiered columnar storage 210 stores a first subset of rows for a set of columns of a database table in the in-memory column store 220 and a second subset of rows for the set of columns in the flash-based column store 230. In one example embodiment, the set of columns stored in the multi-tiered columnar storage 210 includes all columns of the database table. In another embodiment, the set of columns stored in the multi-tiered columnar storage 210 include columns that are determined to be more likely to be accessed based on access frequency statistics (i.e., "hot" columns).

In some embodiments, the number of rows included in the in-memory column store 220 is determined based on system parameters that set a size of the in-memory column store and based on the physical size of the volatile memory. In one embodiment, the number of rows included in the in-memory column store 220 is dynamically adjusted based on the needs of the current workload. For example, the size of the in-memory column store 220 can be increased and a size of a buffer cache can be decreased in response to current workload including more analytic queries and fewer transaction-based queries. Alternatively, the size of the in-memory column store 220 can be decreased and the size of the buffer cache can be increased in response to the current workload including more transaction-based queries. In one embodiment, the rows included in the in-memory column store 220 include rows that are determined to be more likely to be accessed based on access frequency statistics (i.e., "hot" rows).

In accordance with the illustrative embodiment, a database server performs a multi-tier table scan 200 to read values from a set of columns of a database table. The multi-tier table scan 200 comprises accessing a first subset of rows of the set of columns from the in-memory column store 220 to generate a first set of results, accessing a second subset of rows for the set of columns from the flash-based column store 230 to generate a second set of results, and aggregating the first set of results and the second set of results to form a table scan result set 200 for the query.

In some embodiments, metadata 225 maintains data identifying the columns and rows present in the in-memory column store 220. The database server determines whether the query can be satisfied using only the data in the in-memory column store 220 by evaluating metadata 225. If the database server determines that not all data satisfying the query is present in the in-memory column store 220 (i.e., a least a subset of the data satisfying the query is present in flash-based storage or persistent storage), the database server then initiates access to the flash-based column store 230 to complete the query.

In one embodiment, metadata 225 also maintains data identifying the columns and rows present in other tiers, such as the flash-based column store 230. Returning to FIG. 1, network fabric 130 may comprise a remote direct-memory access (RDMA) network fabric, allowing database server 110 and storage server 140 to communicate with high bandwidth and low latency. RDMA allow some computer to directly access data from another without operating system or central processing unit (CPU) involvement. Thus, database server 110 can directly read memory with no additional copying or buffering and with very low latency. In this embodiment, the database instance 111 can access flash-based storage 142 using RDMA rather than offloading query processing to the cell server 141.

In another embodiment, the database server evaluates metadata 225 to determine which rows of the set of columns are not stored in the in-memory column store 220 and offloads query processing for those rows to the storage server to access the flash-based column store 230. With reference to FIG. 1, cell server instance 141 is responsible for query processing offload for accessing rows of the set of columns that are stored at the storage server 140.

In one embodiment, the storage server also includes a disk-based column store (not shown in FIG. 2). Metadata 235 maintains data identifying the columns and rows present in flash-based column store 230. The storage server determines whether the query can be satisfied using the data in the flash-based column store 230 by evaluating metadata 235. If the storage server determines that not all data satisfying the query is present in the flash-based column store 230, the storage server then initiates access to the disk-based column store to complete the query.

In some embodiments, the aggregated table scan results 200 are returned to the requesting application or client in columnar format. For example, the table scan results 200 may include multiple columnar data structures corresponding to the multiple storage tiers. Alternatively, the result sets from the multiple storage tiers can be rearranged or reformatted into one or more columnar data structures. In one embodiment, the result sets from the multiple storage tiers can be decompressed and aggregated into a final result set. This aggregated result set can then be compressed again to form a compressed result set. In yet another embodiment, the table scan results 200 may be converted to row-major format prior to being returned to the requesting application or client.

Procedural Overview

Figure 3:
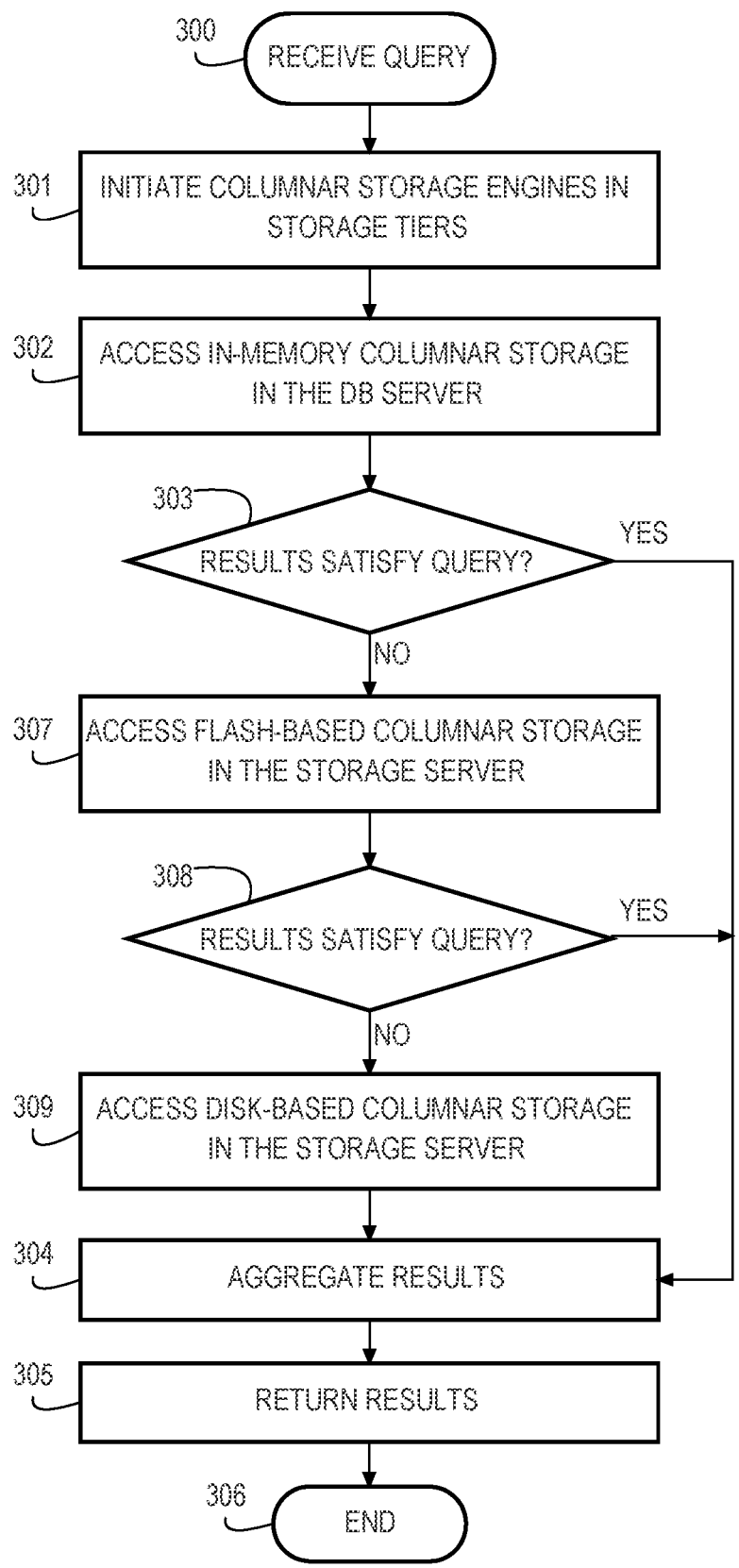
FIG. 3 is a flowchart illustrating operation of a database system evaluating a query across multiple storage tiers in columnar format in accordance with an illustrative embodiment.

FIG. 3 is a flowchart illustrating operation of a database system evaluating a query across multiple storage tiers in columnar format in accordance with an illustrative embodiment. Operation begins with receipt of a query that is an analytic query or a query that involves a table scan from an application or client (block 300). The database system initiates columnar storage engines in the storage tiers of the database system (block 301). In some embodiments, a first columnar storage engine is initiated in the database server and a second columnar storage engine is initiated in the storage server within the database system. The database server accesses in-memory columnar storage in volatile memory in the database server (block 302). The database server determines whether results from the in-memory columnar storage contain all data that satisfy the query (block 303). In one embodiment, the database server determines whether the results from the volatile memory contain all data that satisfy the query by examining metadata that identify rows and columns stored in the in-memory columnar storage prior to accessing the in-memory columnar storage.

If the results contain all data that satisfy the query (block 303: YES), then the database server aggregates the results (block 304) and returns the results to the requesting application or client (block 305). Thereafter, operation ends (block 306).

If the results do not contain all data that satisfy the query (block 303: NO), then the database system accesses flash-based columnar storage in the storage system (block 307). In one embodiment, the database server accesses the flash-based columnar storage using RDMA without operating system or CPU involvement in the storage server. In another embodiment, query processing for accessing the flash-based storage is offloaded to the storage server. A determination is made, by the database server or the storage server, as to whether the results from the in-memory columnar storage and the flash-based columnar storage contain all data that satisfy the query (block 308). In one embodiment, the storage server determines whether the results from the in-memory columnar storage and the flash-based columnar storage contain all data that satisfy the query by examining metadata in the storage server that identify rows and columns stored in the flash-based columnar storage prior to accessing the flash-based columnar storage.

If the results contain all data that satisfy the query (block 308: YES), then the database server aggregates the results from the in-memory columnar storage and the flash-based columnar storage (block 304) and returns the results to the requesting application or client (block 305). Thereafter, operation ends (block 306).

If the results do not contain all data that satisfy the query (block 308: NO), then the database system accesses disk-based columnar storage in the storage system (block 309). In one embodiment, the database server accesses the disk-based columnar storage using RDMA without operating system or CPU involvement in the storage server. In another embodiment, query processing for accessing the disk-based storage is offloaded to the storage server. Then, the database server aggregates the results from the in-memory columnar storage, the flash-based columnar storage, and the disk-based columnar storage (block 304) and returns the results to the requesting application or client (block 305). Thereafter, operation ends (block 306).

FIG. 4A is a flowchart illustrating operation of a database system accessing multiple-tier column storage in accordance with an illustrative embodiment. Operation begins with receipt of a query that is an analytic query or a query that involves a table scan from an application or client (block 400). The database server determines data blocks stored in volatile memory based on metadata stored in the database server (block 401). The database server generates a first set of work granules for accessing volatile memory (block 402) and generates a second set of work granules for accessing flash-based storage (block 403). The database server sends the second set of work granules to the storage server (block 404). The first set of work granules and the second set of work granules are executed in parallel (block 405). Thereafter, operation ends (block 406).

Figure 4B:
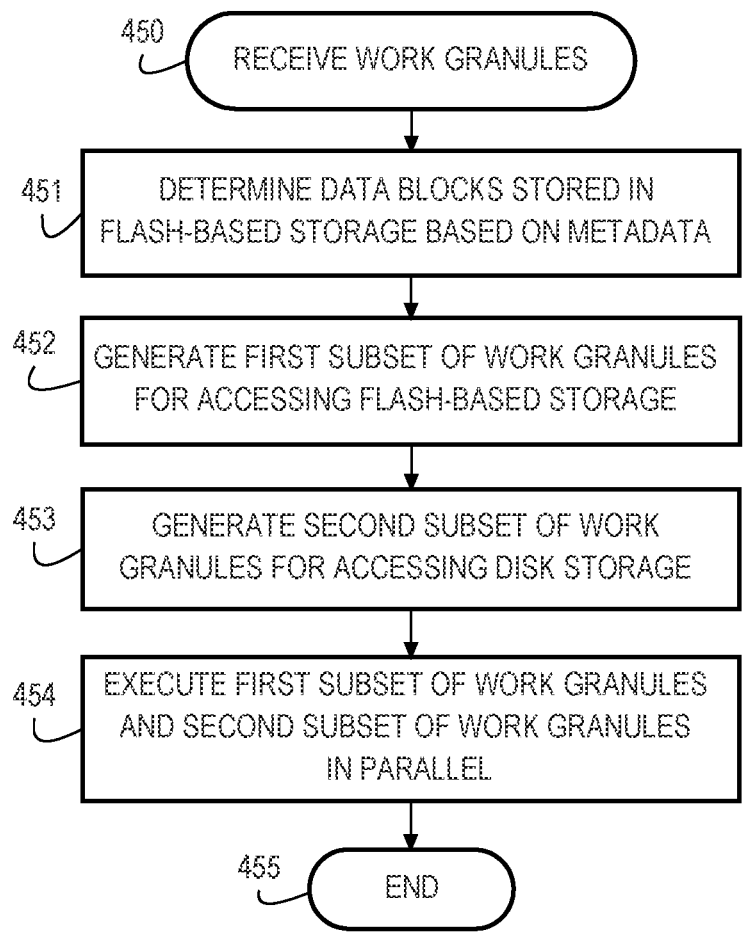
FIG. 4B is a flowchart illustrating operation of a storage system accessing multiple sub-tiers of column storage in accordance with an illustrative embodiment.

FIG. 4B is a flowchart illustrating operation of a storage system accessing multiple sub-tiers of column storage in accordance with an illustrative embodiment. Operation begins with receipt of the second set of work granules at the storage server (block 450). The storage server determines data blocks stored in flash-based storage based on metadata stored in the storage server (block 451). The storage server generates a first subset of work granules for accessing flash-based storage (block 452) and generates a second subset of work granules for accessing disk-based storage (block 453). The first subset of work granules and the second subset of work granules are executed in parallel (block 454). Thereafter, operation ends (block 455).

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
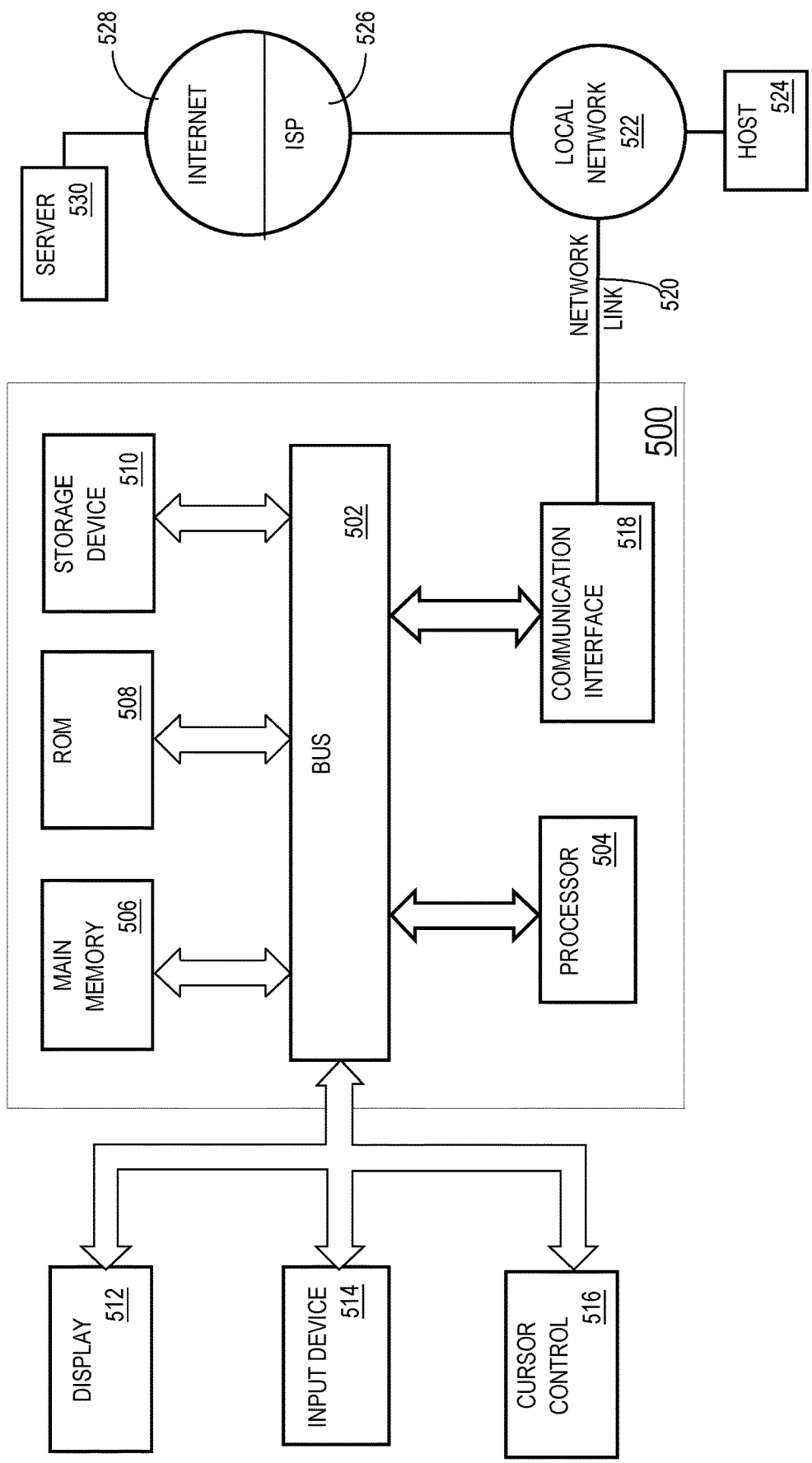
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
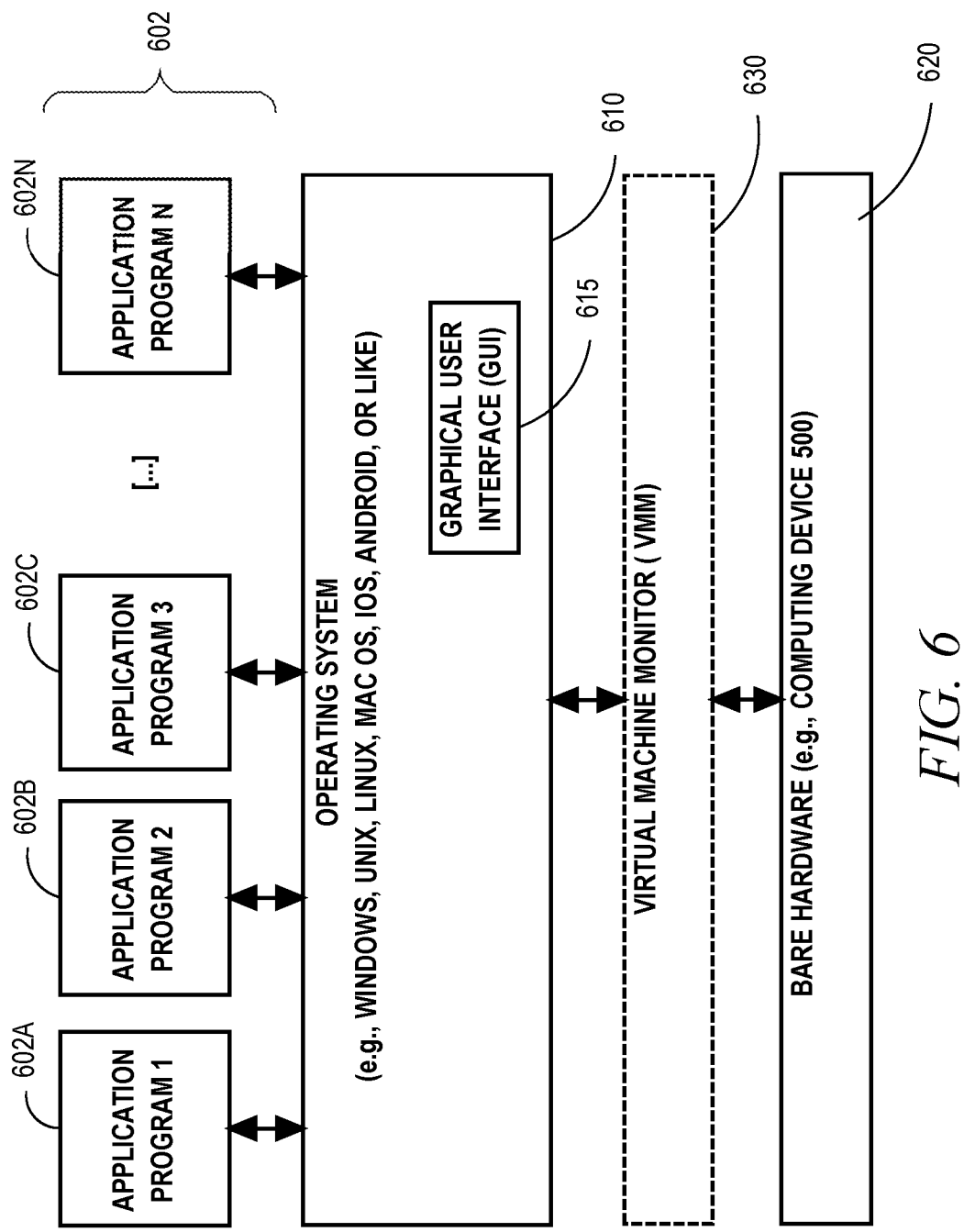
FIG. 6 is a block diagram of a basic software system that may be employed for controlling the operation of a computer system upon which an embodiment of the invention may be implemented.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   in response to receiving, at a database server from a client, a query for reading values from a set of columns of a database table, performing a multiple-tier columnar operation, wherein rows of the set of columns of the database table are stored in columnar format in a plurality of tiers including two more of a volatile memory tier, a flash cache storage tier, or a disk storage tier,
   wherein performing the multiple-tier columnar operation comprises:
      accessing, by the database server, a first subset of rows for the set of columns in columnar format in a first tier to generate a first set of results, wherein the first tier is one of the plurality of tiers;
      accessing, by a storage server, a second subset of rows for the set of columns in columnar format in a second tier to generate a second set of results, wherein the second tier is a different one of the plurality of tiers, and wherein at least a subset of data satisfying the query is present in the second tier; and
      aggregating the first set of results and the second set of results to form a query result set; and
   returning the query result set to the client,
   wherein performing the multiple-tier columnar operation further comprises:
      determining, based on metadata stored in the database server, a first set of data blocks for the query that are stored in the first tier in the database server and a second set of data blocks for the query that are stored in the second tier in the storage server;
      generating a first set of work granules for accessing the first set of data blocks in the database server and a second set of work granules for accessing the second set of data blocks in the storage server; and
      executing, in parallel, the first set of work granules in the database server and the second set of work granules in the storage server, and
   wherein the method is performed by one or more computing devices.

2. The method of claim 1, wherein:
   performing the multiple-tier columnar operation comprises initializing a first columnar storage engine in the first tier and initializing a second columnar storage engine in the second tier;
   accessing the first subset of rows is performed by the first columnar storage engine; and
   accessing the second subset of rows is performed by the second column storage engine.

3. The method of claim 1, wherein the columnar format comprises a compressed read-only columnar format.

4. The method of claim 3, further comprising decompressing the first set of results and the second set of results prior to returning the query result set to the client.

5. The method of claim 4, further comprising converting the query result set into row-major format prior to returning the query result set to the client.

6. The method of claim 1, wherein the first tier is a volatile memory within the database server and the second tier is a flash cache memory within a storage server.

7. The method of claim 1, wherein:
   the first tier is a volatile memory within the database server,
   the second tier is storage within a storage server,
   the storage within the storage server includes flash cache storage and disk storage;

the second subset of rows includes a first group of rows and a second group of rows, and accessing the second subset of rows for the set of columns in columnar format in the second tier comprises:
  accessing the first group of rows in columnar format in the flash cache storage;
  accessing the second group of rows in columnar format in the disk storage; and
  aggregating the first group of rows from the flash cache storage and the second group of rows from the disk storage to form the second set of results.

8. The method of claim 1, wherein performing the multiple-tier columnar operation further comprises:
  determining, by the storage server based on metadata stored in the storage server, a first group of data blocks for the query that are stored in flash cache storage and a second group of data blocks for the query that are stored in disk storage;
  dividing the second set of work granules into a first subset of work granules for accessing the flash cache storage and a second subset of work granules for accessing the disk storage; and
  executing, in parallel, the first subset of work granules and the second subset of work granules.

9. The method of claim 1, wherein the query comprises a table scan or an analytic query.

10. One or more non-transitory storage media storing instructions which, when executed by one or more computing devices, cause:
  in response to receiving, at a database server from a client, a query for reading values from a set of columns of a database table, performing a multiple-tier columnar operation, wherein rows of the set of columns of the database table are stored in columnar format in a plurality of tiers including two more of a volatile memory tier, a flash cache storage tier, or a disk storage tier,
  wherein performing the multiple-tier columnar operation comprises:
    accessing, by the database server, a first subset of rows for the set of columns in columnar format in a first tier to generate a first set of results, wherein the first tier is one of the plurality of tiers;
    accessing, by a storage server, a second subset of rows for the set of columns in columnar format in a second tier to generate a second set of results, wherein the second tier is a different one of the plurality of tiers, and wherein at least a subset of data satisfying the query is present in the second tier; and
    aggregating the first set of results and the second set of results to form a query result set; and
  returning the query result set to the client, and
  wherein performing the multiple-tier columnar operation further comprises:
    determining, based on metadata stored in the database server, a first set of data blocks for the query that are stored in the first tier in the database server and a second set of data blocks for the query that are stored in the second tier in the storage server;
    generating a first set of work granules for accessing the first set of data blocks in the database server and a second set of work granules for accessing the second set of data blocks in the storage server; and
    executing, in parallel, the first set of work granules in the database server and the second set of work granules in the storage server.

11. The one or more non-transitory storage media of claim 10, wherein:
  performing the multiple-tier columnar operation comprises initializing a first columnar storage engine in the first tier and initializing a second columnar storage engine in the second tier;
  accessing the first subset of rows is performed by the first columnar storage engine; and
  accessing the second subset of rows is performed by the second column storage engine.

12. The one or more non-transitory storage media of claim 10, wherein the columnar format comprises a compressed read-only columnar format.

13. The one or more non-transitory storage media of claim 12, wherein the instructions, when executed by the one or more computing devices, further cause decompressing the first set of results and the second set of results prior to returning the query result set to the client.

14. The one or more non-transitory storage media of claim 13, wherein the instructions, when executed by the one or more computing devices, further cause converting the query result set into row-major format prior to returning the query result set to the client.

15. The one or more non-transitory storage media of claim 10, wherein the first tier is a volatile memory within the database server and the second tier is a flash cache memory within a storage server.

16. The one or more non-transitory storage media of claim 10, wherein:
  the first tier is a volatile memory within the database server,
  the second tier is storage within a storage server,
  the storage within the storage server includes flash cache storage and disk storage;
  the second subset of rows includes a first group of rows and a second group of rows, and accessing the second subset of rows for the set of columns in columnar format in the second tier comprises:
    accessing the first group of rows in columnar format in the flash cache storage;
    accessing the second group of rows in columnar format in the disk storage; and
    aggregating the first group of rows from the flash cache storage and the second group of rows from the disk storage to form the second set of results.

17. The one or more non-transitory storage media of claim 10, wherein performing the multiple-tier columnar operation further comprises:
  determining, by the storage server based on metadata stored in the storage server, a first group of data blocks for the query that are stored in flash cache storage and a second group of data blocks for the query that are stored in disk storage;
  dividing the second set of work granules into a first subset of work granules for accessing the flash cache storage and a second subset of work granules for accessing the disk storage; and
  executing, in parallel, the first subset of work granules and the second subset of work granules.

18. An apparatus comprising at least one processor and a memory, coupled to the at least one processor, wherein the memory comprises instructions which, when executed by the at least one processor, cause:
  in response to receiving, at a database server from a client, a query for reading values from a set of columns of a database table, performing a multiple-tier columnar operation, wherein rows of the set of columns of the database table are stored in columnar format in a plurality of tiers including two more of a volatile memory tier, a flash cache storage tier, or a disk storage tier, wherein performing the multiple-tier columnar operation comprises:
    accessing, by the database server, a first subset of rows for the set of columns in columnar format in a first tier to generate a first set of results, wherein the first tier is one of the plurality of tiers;
    accessing, by a storage server, a second subset of rows for the set of columns in columnar format in a second tier to generate a second set of results, wherein the second tier is a different one of the plurality of tiers, and wherein at least a subset of data satisfying the query is present in the second tier; and
    aggregating the first set of results and the second set of results to form a query result set; and
    returning the query result set to the client, and wherein performing the multiple-tier columnar operation further comprises:
    determining, based on metadata stored in the database server, a first set of data blocks for the query that are stored in the first tier in the database server and a second set of data blocks for the query that are stored in the second tier in the storage server;
    generating a first set of work granules for accessing the first set of data blocks in the database server and a second set of work granules for accessing the second set of data blocks in the storage server; and
    executing, in parallel, the first set of work granules in the database server and the second set of work granules in the storage server.

19. The apparatus of claim 18, wherein:
performing the multiple-tier columnar operation comprises initializing a first columnar storage engine in the first tier and initializing a second columnar storage engine in the second tier;
accessing the first subset of rows is performed by the first columnar storage engine; and
accessing the second subset of rows is performed by the second column storage engine.

20. The apparatus of claim 18, wherein performing the multiple-tier columnar operation further comprises:
    determining, by the storage server based on metadata stored in the storage server, a first group of data blocks for the query that are stored in flash cache storage and a second group of data blocks for the query that are stored in disk storage;
    dividing the second set of work granules into a first subset of work granules for accessing the flash cache storage and a second subset of work granules for accessing the disk storage; and
    executing, in parallel, the first subset of work granules and the second subset of work granules.

\* \* \* \* \*